April 25, 1950 F. R. VAN DER WOUDE 2,505,264

HIGH-INERTIA PHONOGRAPH TURNTABLE

Filed March 3, 1945

INVENTOR.
FRITZ R. VAN DER WOUDE
BY

Patented Apr. 25, 1950

2,505,264

UNITED STATES PATENT OFFICE 2,505,264

HIGH-INERTIA PHONOGRAPH TURNTABLE

Fritz R. van der Woude, Elyria, Ohio, assignor to The General Industries Company, Elyria, Ohio, a corporation of Ohio Application March 3, 1945, Serial No. 580,857

3 Claims. (Cl. 274—39)

My invention relates to phonograph turntables and relates more particularly to that type thereof of turntables adapted for supporting phonograph disc records in playing position and adapted to be driven by an electric motor disposed below the turntable.

My improved disc record supporting turntable is particularly advantageous in phonograph mechanisms where the turntable is rotated by virtue of a frictional driving engagement between a motor driven wheel or disc disposed below the record supporting upper planular surface of the turntable and within a circumferential pendant flange of the turntable; although my invention, in its broader aspects, is not limited thereto, my improved turntable is well adapted for employment in connection with turntable driving mechanisms of the general type exemplified by the disclosures of the co-pending application of Herbert L. Hartman, Serial No. 550,995, filed August 24, 1944, now Patent No. 2,421,910, issued June 10, 1947.

An object of my invention is to provide an improved turntable having a pendant rim flange, the inner surface of which may be made and maintained in substantially true circular form.

Another object of my invention is to achieve the foregoing object, while additionally providing the turntable with a circumferential even co-axial distribution of additional weight, to increase the inertia effect or momentum of the turntable, whereby momentary influences tending to vary the speed will be considerably less effective than is the case with phonograph turntables of the types heretofore proposed, with which I am familiar.

Another object of my invention is to provide an improved turntable, the main body of which is conveniently made of sheet metal, but which is not vibratile or responsive to tonal effects, or forces.

Another object of my invention is to achieve each and both of the foregoing objects in a turntable construction which can be economically manufactured in an expeditious and reliable manner.

Another object of my invention is to provide a unitary turntable and hub therefor of simple and economical construction.

Other objects of my invention and the invention itself will be evident from the following description of an embodiment thereof which I prefer, and from the drawings illustrating the said embodiment.

In the drawings:

Fig. 1 is a cross sectional view of a turntable which is an embodiment of my invention, the view being taken on a radius extending outwardly from the center of the turntable, the view indicating the relative positioning of the turntable and a typical driving mechanism therefor comprising an idler wheel and a driving roller therefor, a fragment of the motor and motor shaft carrying said roller being merely indicated in operative position and shown in side elevation;

Figures 1, 2:
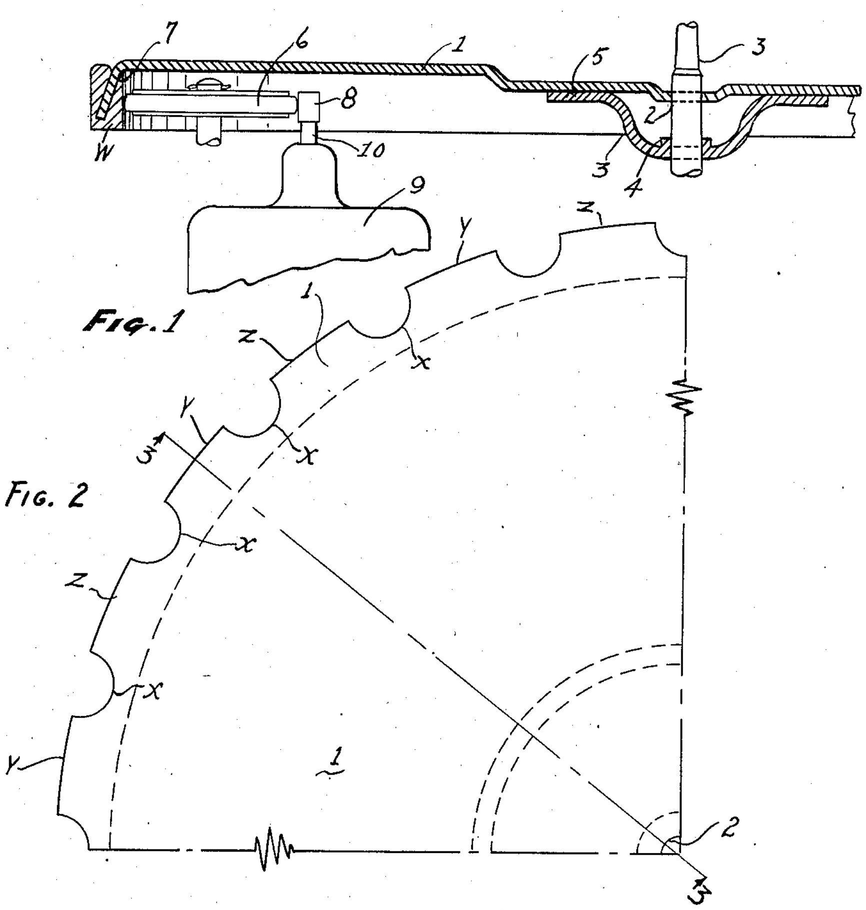
Fig. 2 is a plan view of the one-four part or sector of a sheet metal blank employed in the said embodiment of Fig. 1, the one-fourth portion of the blank shown being disposed within the right angle provided by two radial lines 90° apart proceeding from the center of the substantially disc form blank.

Referring now to the drawings in all of which like parts are indicated by like reference characters, the main body portion of the turntable is readily provided by first stamping out a sheet metal blank 1 of which Fig. 2 illustrates a quarter sector only, the peripheral portions being cut away at equal intervals as at $x$, to provide intervening tongues as at $y$ and $z$, throughout the entire periphery of the blank.

The blank 1 is centrally apertured at 2, in any usual manner, and may as shown be provided with a hub annulus 3 welded thereto, as at 5, at a plurality of circularly disposed points, and preferably terminating radially inwardly in a pendant short re-entrant tubular flange 4 which is axially aligned with, but spaced below, the circular wall of the opening 2; said circular opening and the inner wall of the flange 4 are preferably so shaped, and relatively dimensioned as to make a seating fit with the upwardly tapered sides of the usual rotatable turntable supporting post, as exemplified in said co-pending Hartman application.

However, for those aspects of my invention which involve the peripheral weighting of the turntable, the construction of the central portion of the turntable may be widely variant from the simple but efficient construction herein disclosed.

Figure 3:
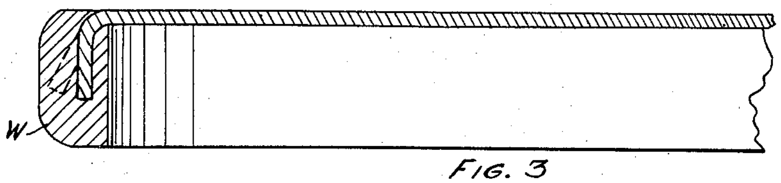
Fig. 3 is an enlarged radial sectional view of a fragment of the completed turntable of Fig. 1.
Figure 4:
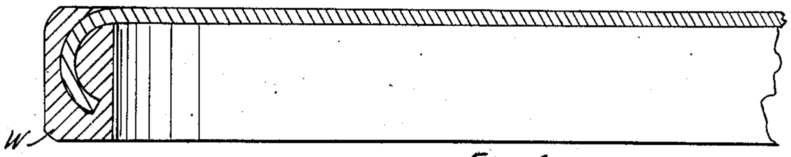
Figs. 4 and 5 are views of the nature of Fig. 3 but illustrating the peripheral extensions of Fig. 2 bent to different forms to ensure anchoring of a cast-metal annular rim upon said extensions.
Figure 5:
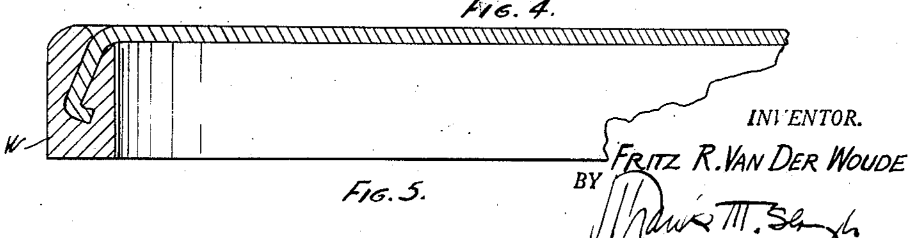

The peripheral projections $x$ and $y$, of the turntable, as shown in Figs. 3 to 5 inclusive, are downturned, variously, in such manner as to provide skeleton frame supports for the annular weighting flange element W, which is cast onto said projections, and which becomes supporting lugs for the weighting rim W of the turntable.

The weighting rim W is preferably of a metal having a substantially lower melting point than the material of the blank 1. Preferably, the blank will be of steel and for the annular weighting rim W zinc, zinc alloy or the like may, for example, be employed.

I prefer to die-cast said element W onto the pendant lugs *y* and *z*, whereby true circular form, uniform weight, and concentricity with the axis of the turntable may readily be achieved consistently, in quantity production, without undue machining after the casting operation.

Referring now particularly to Fig. 3, the alternate substantially straight pendant lugs *y* and *z* are shown as divergent, within the body of the rim W.

In Fig. 4, an inwardly curved lug is shown, whereas in Fig. 5 a substantially straight lug with an inwardly bent tip is disclosed.

From the disclosure, it is clear that the lugs may be of widely variant form and may comprise some lugs extending differently within the body of the weighting rim W, the better to ensure a rigid bond between the turntable and rim, even though the die-casting operation is not properly and most efficiently done.

The presence of the heavy non-vibratile zinc or like annulus rigidly affixed to the peripheral portion of the sheet metal disc 1, dampens the disc against responding to forces which otherwise would cause it to produce tonal effects, or to reproduce such effects in the effect upon a carried record disc.

When, as indicated in Fig. 1, the roller 8, carried on the shaft 10 of a motor 9, frictionally drives an idler wheel 6, and the rubber rim thereof peripherally engaging the inner surface 7 of the weighting rim W, and the said surface 7 being truly cylindrical or at least circularly concentric with the axis of the turntable, (*a—a*, Fig. 1), a very uniform driving effort is exerted by the idler wheel rim upon the turntable.

In prior constructions such uniformity of frictional driving effect is not reliably had, and this is particularly the fact where sheet metal stamped turntables are employed, as these, when produced in quantity production, do not always have all radially located driven flange portions relatively equidistant from the axis of rotation of the turntable. Consequently, the sounds resulting from the playing of records resting upon such prior turntables are not reproduced with that fidelity which is desired by music lovers and other persons having the ability to notice tonal discrepancies.

By virtue of my present invention, much of the cause of such discrepancies are greatly reduced by the fact of true circularity of the driven turntable surface 7; other causes are also greatly reduced by the increased inertia effect of the rotating turntable effected by the great weight of the rim disposed at the turntable periphery. True concentricity is also enhanced by direct application of the walls of the central opening 2 to the post 3.

Having described my invention in several illustrative embodiments, I am aware that numerous and extensive departures may be made therefrom without departing from the spirit of the invention and the scope of the appended claims.

I claim:

1. In a phonograph turntable for rotatively supporting phonograph disc records, the combination of a record supporting sheet metal disc, said disc having a substantially planular main body portion, said body portion peripherally provided with integral pendant circumferentially spaced lug extensions, and a relatively more massive rim for said turntable of a metallic material which is substantially non-resonant as compared to the material of said disc and having a lower melting point and of greater specific gravity than said disc metal, said rim integrally secured to and encompassing the pendant disc extensions and being of true annular form having a true cylindrical inner surface disposed below said main body disposed concentrically to the axis of the disc, said inner rim surface adapted for engagement by the periphery of a motor driven friction wheel for effecting rotation of the turntable and to suppress tonal vibrations of said record supporting disc.

2. In a phonograph turntable for rotatively supporting phonograph disc records, the combination of a record supporting sheet metal disc, said disc having a substantially planular main body portion, said body portion peripherally provided with integral pendant circumferentially disposed portions, and a relatively more massive rim for said turntable of a metallic material which is substantially nonresonant as compared to the material of said disc and having a lower melting point and of greater specific gravity than said disc metal, said rim secured to and radially encompassing the pendant plate portions to cause the inner surface of said rim to be smooth and of true cylindrical form at least with respect to most of the medial portion of its radial extent and said inner surface being disposed concentrically to the axis of the disc, said inner rim surface adapted for engagement by the periphery of a motor driven friction wheel for effecting rotation of the turntable and to suppress tonal vibrations of said record supporting disc, said pendant portions being so formed and disposed in embedded relation to the body of the rim as to effect a dove-tailing attachment of said portions within said rim.

3. In a phonograph turntable for rotatively supporting phonograph disc records, the combination of a record supporting sheet metal disc, said disc having a substantially planular main body portion, said body portion peripherally provided with integral pendant circumferentially disposed portions, and a relatively more massive rim for said turntable of a metallic material which is substantially non-resident as compared to the material of said disc and having a lower melting point and of greater specific gravity than said disc metal, said rim integrally secured to and radially encompassing the pendant plate portions to cause the inner surface of said die-cast rim to be smooth and of true cylindrical form at least with respect to most of the medial portion of its radial extent and said inner surface being disposed concentrically the axis of the disc, said inner rim surface adapted for engagement by the periphery of a motor driven friction wheel for effecting rotation of the turntable and to suppress tonal vibrations of said record supporting disc.

FRITZ R. VAN DER WOUDE.

(References on following page)

REFERENCES CITED

The following references are of record in the file of this patent:

UNITED STATES PATENTS

| Number | Name | Date |
|---|---|---|
| 1,128,756 | Catucci | Feb. 16, 1915 |
| 1,347,113 | Merriam | July 20, 1920 |
| 1,690,267 | Barrows et al. | Nov. 6, 1928 |
| 2,026,878 | Farr | Jan. 7, 1936 |
| 2,081,605 | Sinclair | May 25, 1937 |
| 2,088,191 | Eksergian | July 27, 1937 |

FOREIGN PATENTS

| Number | Country | Date |
|---|---|---|
| 167,976 | Great Britain | Aug. 25, 1921 |
| 478,312 | Great Britain | Jan. 14, 1938 |